United States Patent [19]

Feenstra et al.

[11] 4,314,834
[45] Feb. 9, 1982

[54] COATING APPARATUS FOR MANUFACTURING OPTICAL FIBERS

[75] Inventors: Johannes Feenstra; Marius A. F. Klop; Wilhelmus C. P. M. Meerman; Jan G. J. Peelen; Hermanus N. Tuin, all of Eindhoven, Netherlands

[73] Assignee: U.S. Philips Corporation, New York, N.Y.

[21] Appl. No.: 155,696

[22] Filed: Jun. 2, 1980

Related U.S. Application Data

[62] Division of Ser. No. 132,470, Mar. 19, 1980.

[30] Foreign Application Priority Data

Mar. 21, 1979 [NL] Netherlands ............... 7902201

[51] Int. Cl.³ ............... C03C 25/02; C03B 37/025
[52] U.S. Cl. .................. 65/11.1; 65/3.11; 118/125; 118/405; 118/DIG. 18
[58] Field of Search ............... 118/125, 405, DIG. 18; 65/3.11, 3.12, 3.2, 11 W

[56] References Cited

U.S. PATENT DOCUMENTS

| | | | |
|---|---|---|---|
| 2,346,697 | 4/1944 | Mungall | 118/125 |
| 4,030,901 | 6/1977 | Kaiser | 65/2 |
| 4,194,462 | 3/1980 | Knowles | 65/3.11 X |
| 4,201,431 | 7/1980 | Bachman et al. | 65/3.12 |

OTHER PUBLICATIONS

Ceramic Bulletin, vol. 55, #2, (1976), Payne et al., pp. 195-197.
Bell System Technical Journal, vol. 57, #6, Aug. 1978, pp. 1735-1744.

*Primary Examiner*—Robert L. Lindsay, Jr.
*Attorney, Agent, or Firm*—Marc D. Schechter

[57] ABSTRACT

Method of and apparatus for manufacturing optical fibers in which a preform is heated in a furnace which is provided with a graphite heating element and a fiber is drawn from the heated preform. The fiber is subsequently cooled, provided with a coating, and, after drying of the coating, the fiber is wound onto a reel.

For applying a coating to the fiber, the fiber is passed through a nozzle which has a polygonal nozzle opening.

7 Claims, 7 Drawing Figures

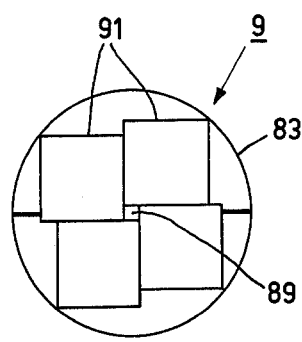
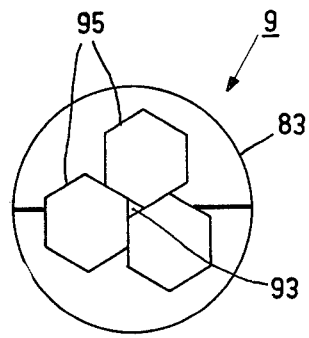
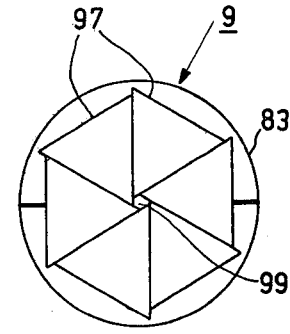
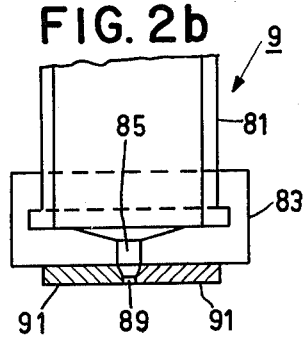
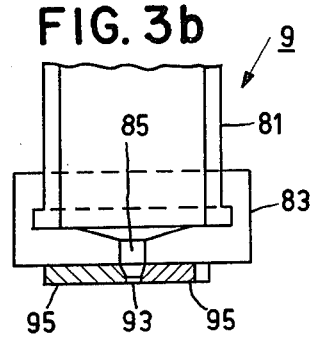
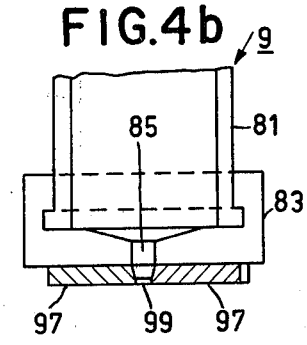

COATING APPARATUS FOR MANUFACTURING OPTICAL FIBERS

This is a division of application Ser. No. 132,470, filed Mar. 19, 1980.

BACKGROUND OF THE INVENTION

The invention relates to a method of manufacturing optical fibers wherein, a preform is heated in a furnace, one end of the preform is melted, a fiber is drawn from the melting end of the preform and the fiber is withdrawn from the furnace. In this method, the preform and of the fiber located in the furnace are flushed with a gas, after which the drawn fiber is cooled and provided with a coating which is subsequently dried. Finally, the fiber thus obtained is wound onto a reel.

Such a method is known from the article "Preform Fabrication and Fiber Drawing by Western Electric Product Engineering Control Center", published in the Bell System Technical Journal, Vol. 57, No. 6, July–August 1978, pages 1735 to 1744.

For heating the preform this known method employs a graphite resistance element. Owing to its thermal and mechanical properties, i.e. a high thermal shock resistance and a suitable strength at high temperatures, graphite is extremely suitable for this purpose. Moreover, graphite is comparatively cheap, available in pure form and easy to work. However, graphite has the drawback that at the operating temperatures of approximately 2000° C. it is subject to substantial oxidation.

It is known that the drawing conditions may adversely affect the strength of the fiber drawn. Contamination of the fiber by dust particles, owing to the deposition of reaction products from the furnace, such as for example silicon carbide, silica particles etc. will result in damaging and deterioration of the fiber. Contamination of the fiber by dust particles can be avoided by a dust-free environment. The formation of reaction products can be limited by maintaining an inert-gas atmosphere at overpressure in the furnace, so that the admission of air is prevented. Settlement of reaction products on the fiber can be minimized by flushing the fiber with an inert gas stream.

SUMMARY OF THE INVENTION

After the fiber has been drawn in the furnace and after cooling, the fiber should be protected as soon as possible against contamination, ageing and mechanical damage. For this purpose the fiber is provided with a hard, thin coating with a thickness of for example 3 to 5 $\mu$m for a fiber having a diameter of 100 $\mu$m. The coating is applied in a low viscosity quick-drying solution with the aid of a coating device which comprises a funnel. The funnel is provided with a nozzle opening. Mechanical guiding and centering of the fiber is not feasible in view of the risk of damage to the fiber. Until now use was made of a funnel with a circular nozzle opening. However, when such a nozzle opening is used the centering effect of the coating stream on the fiber is very small. The fibre tends to pass through the nozzle opening with such a high eccentricity that owing to surface tension the coating can no longer be distributed uniformly and concentrically over the fiber circumference. This gives rise to bending stresses in the fiber during drying of the coating, resulting in micro-bending.

SUMMARY OF THE INVENTION

It is an object of the invention to provide a uniform coating on optical fibers and to eliminate or minimize bending stresses due to such coating.

A uniform and concentric coating is obtained, according to the invention, in that the nozzle opening is polygonal. Owing to the hydraulic pressures obtaining in the corners of the nozzle opening the coating will exert a directional centering effect on the fiber. As the coating is applied in a plurality of thicker and thinner strips which are uniformly distributed over the fiber circumference, the coating is distributed concentrically over the circumference of the fiber under the influence of the surface tension of the coating. Owing to the uniformly distributed strips an improved lubricating effect is obtained.

In a preferred embodiment of the apparatus according to the invention, the funnel is provided with a plurality of adjustable segments which bound the nozzle opening. By adjusting the segments it is possible to easily adapt the nozzle opening to the fiber diameter and to adjust the desired coating thickness in such a way that mechanical contact of the fiber with the nozzle is avoided.

BRIEF DESCRIPTION OF THE DRAWINGS

The invention will be described in more detail with reference to the drawing.

FIGS. 2a, 3a and 4a show different embodiments of a coating device, in bottom view.

FIGS. 2b, 3b and 4b show various embodiments of the coating device in cross-sectional view.

Figure 1:
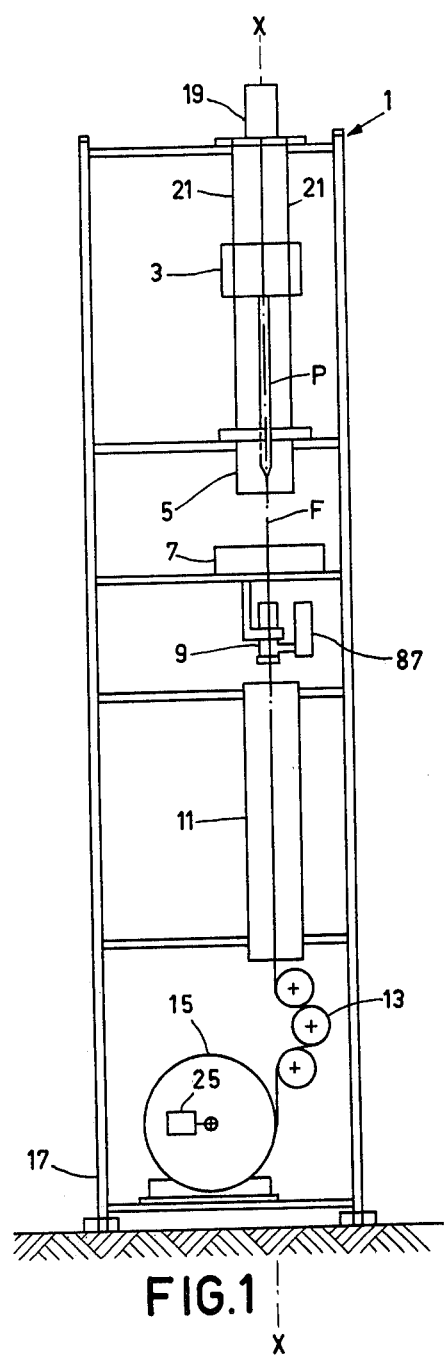
FIG. 1 schematically represents an embodiment of an apparatus according to the invention for manufacturing optical fibers.

The apparatus 1 shown in FIG. 1 for manufacturing optical fibers comprises a holder 3 for a preform P, a furnace 5 for drawing a fiber F, a measuring device 7, a coating device 9, a drying device 11, a drawing force measuring device 13 and a reel 15. These components and devices are mounted on a common frame 17, the center lines of the furnace 5, the measuring device 7 and the coating device 9 coinciding with a common axis X—X. The holder 3 is moved in a manner, known per se, by a drive mechanism 19 on guides 21. The reel 15 is driven by a motor 25 and also serves as drawing device. The measuring device 7 serves for measuring and checking the diameter of the fiber F.

The coating device 9 is represented in various forms in FIGS. 2a, 3a, and 4a in bottom view and FIGS. 2b, 3b, and 4b in cross-sectional view. In these Figures identical elements bear the same reference numerals.

All three embodiments comprise a funnel 81, which functions as coating reservoir and is provided with a nozzle 83 having a central outlet duct 85 of circular cross-section. The outlet duct 85 adjoins a polygonal nozzle opening, which is bounded by a plurality of segments, which are mounted on the nozzle. The cross-section of the nozzle opening gradually decreases and it terminates in a short portion of constant cross-section, which determines the thickness of the coating to be applied to the fiber. The cross-section of the outlet duct 85 is greater than the cross-section of the adjacent portion of the nozzle opening. The funnel 81 communicates with a level control, not shown.

In the embodiment of FIGS. 2a and b, a square nozzle opening 89 is bounded by four segments 91.

FIGS. 3a and 5b show a triangular nozzle opening 93 having three segments 95.

The embodiment of FIGS. 4a and 6b is provided with six segments 97, which bound a hexagonal nozzle opening 99.

The segments are adjustable so that the circle inscribed in that portion of the polygon of constant cross-section, is approximately 10% greater than the outer diameter of the fiber to be coated. This prevents the fiber from coming into contact with the segments. The operation and the effect of the polygonal nozzle opening according to the invention has already been described, above.

What is claimed is:

1. An apparatus for manufacturing optical fibers comprising:
    means for holding and feeding a preform;
    means for heating the preform received from the holding and feeding means;
    means for drawing an optical fiber from the heated preform, said optical fiber having a substantially circular cross-section; and
    means for providing a protective coating on the fiber, said coating means comprising a funnel provided with a nozzle opening at an outlet end, said nozzle having a polygonal shape and having suitable dimensions such that a circle, having a diameter greater than the outside diameter of the fiber to be coated, may be inscribed in the nozzle opening.

2. A coating apparatus, for providing a protective coating around optical fibers having substantially circular cross-sections, comprising a funnel provided with a nozzle opening at an outlet end, said nozzle having a polygonal shape and having suitable dimensions such that a circle, having a diameter greater than the outside diameter of the fiber to be coated, may be inscribed in the nozzle opening.

3. An apparatus as claimed in claim 1 or 2, wherein the funnel is provided with a plurality of adjustable segments which define the nozzle opening.

4. An apparatus as claimed in claim 3, wherein the nozzle opening is square.

5. An apparatus as claimed in claim 3, wherein the nozzle opening is triangular.

6. An apparatus as claimed in claim 3, wherein the nozzle opening is hexagonal.

7. An apparatus for manufacturing optical fibers, as claimed in claim 1, wherein the inscribed circle has a diameter approximately 10% larger than the outside diameter of the fiber.

* * * * *